(12) United States Patent
Blake

(10) Patent No.: US 9,889,904 B1
(45) Date of Patent: Feb. 13, 2018

(54) QUICK-ASSEMBLY FRONT END FOR BICYCLES

(71) Applicant: Terence Gregory Blake, Madison, WI (US)

(72) Inventor: Terence Gregory Blake, Madison, WI (US)

( * ) Notice: Subject to any disclaimer, the term of this patent is extended or adjusted under 35 U.S.C. 154(b) by 253 days.

(21) Appl. No.: 14/750,537

(22) Filed: Jun. 25, 2015

(51) Int. Cl.
| | |
|---|---|
| *B62K 21/06* | (2006.01) |
| *B62K 21/12* | (2006.01) |
| *B62K 21/18* | (2006.01) |
| *B62K 21/24* | (2006.01) |

(52) U.S. Cl.
CPC .............. *B62K 21/18* (2013.01); *B62K 21/06* (2013.01); *B62K 21/12* (2013.01); *B62K 21/24* (2013.01)

(58) Field of Classification Search
CPC ........ B62K 21/02; B62K 21/06; B62K 21/12; B62K 21/18; B62K 21/24
See application file for complete search history.

(56) References Cited

U.S. PATENT DOCUMENTS

| | | | | |
|---|---|---|---|---|
| 373,028 | A * | 11/1887 | Randolf ................. | B62K 21/06 280/279 |
| 1,364,496 | A * | 1/1921 | Weaver .................. | B62K 21/12 403/370 |
| 2,160,035 | A * | 5/1939 | Schwinn ................ | B62K 21/02 280/279 |
| 2,280,662 | A * | 4/1942 | Pawsat ................... | B62K 21/12 403/301 |
| 2,349,933 | A * | 5/1944 | Barry ..................... | B62K 21/12 403/370 |
| 2,430,524 | A * | 11/1947 | Miller .................... | B62K 21/12 403/370 |
| 3,006,230 | A * | 10/1961 | McCauley, Jr. ........ | B21D 53/24 285/403 |
| 3,385,615 | A * | 5/1968 | Hussey .................. | B62K 21/12 403/235 |
| 3,425,312 | A * | 2/1969 | McCauley ............. | B62K 21/12 411/427 |
| 3,485,113 | A | 12/1969 | Adcock | |
| 3,807,255 | A | 4/1974 | Baginski | |

(Continued)

FOREIGN PATENT DOCUMENTS

| | | | | |
|---|---|---|---|---|
| DE | 555278 | C * | 7/1932 | ............. B62K 21/12 |
| DE | 102007057326 | A1 * | 6/2009 | ............. B62K 15/00 |
| WO | WO 0029279 | * | 5/2000 | |

*Primary Examiner* — Joseph M Rocca
*Assistant Examiner* — Maurice L Williams
(74) *Attorney, Agent, or Firm* — Craig A. Fieschko, Esq.; DeWitt Ross & Stevens S.C.

(57) ABSTRACT

A front end assembly that simplifies assembling of bicycles includes a threaded center bolt, a stem body, a stem tube, a frame head tube, and a fork steering tube with a wedge immovably fixed therein. The wedge includes a stem interface that complementarily fits with the stem tube to rotationally align the fork, and a bolt interface that engages the center bolt. The steering tube is inserted into the head tube from the bottom, and the stem tube is inserted into the head tube from the top. The center bolt threadably engages the bolt interface of the wedge to secure components together. The position of the wedge within the stem tube vertically aligns the stem body with respect to the fork steering tube. Automated alignment and tensioning eliminates much guesswork, and the assembly process is shortened.

20 Claims, 3 Drawing Sheets

(56) References Cited

U.S. PATENT DOCUMENTS

| | | | | |
|---|---|---|---|---|
| 3,831,979 A | * | 8/1974 | Baginski | B62K 21/02 280/279 |
| 4,167,352 A | * | 9/1979 | Pletscher | B62K 21/18 403/104 |
| 4,274,301 A | * | 6/1981 | Katayama | B62K 21/12 403/11 |
| 4,410,197 A | * | 10/1983 | St. Hillaire | B62K 21/16 280/279 |
| 4,466,629 A | * | 8/1984 | Sinyard | B62K 19/32 280/279 |
| 4,651,590 A | | 3/1987 | Thun | |
| 4,783,187 A | * | 11/1988 | McMurtrey | B62K 21/22 280/279 |
| 5,002,297 A | * | 3/1991 | Klein | B62K 21/02 280/279 |
| 5,003,839 A | * | 4/1991 | Yang | B62K 21/18 188/67 |
| 5,085,063 A | * | 2/1992 | Van Dyke | B62H 5/04 280/279 |
| 5,197,349 A | * | 3/1993 | Herman | B62K 21/18 280/278 |
| 5,201,242 A | * | 4/1993 | Chi | B62K 21/18 403/370 |
| 5,213,006 A | * | 5/1993 | Liao | B62K 21/18 403/374.4 |
| 5,251,494 A | * | 10/1993 | Edwards | B62K 21/18 280/279 |
| 5,279,181 A | * | 1/1994 | Boudreau | B62K 21/18 280/279 |
| 5,330,302 A | * | 7/1994 | Chen | B62K 21/18 411/432 |
| 5,442,973 A | * | 8/1995 | Liao | B62K 21/18 280/279 |
| 5,517,878 A | * | 5/1996 | Klein | B62K 21/16 403/371 |
| 5,540,457 A | * | 7/1996 | Johnson | B62K 21/06 280/279 |
| 5,680,798 A | * | 10/1997 | Luen | B62K 21/18 280/279 |
| 5,782,479 A | * | 7/1998 | Adams | B62K 21/18 280/279 |
| 6,698,781 B1 | * | 3/2004 | Blake | B62K 21/18 280/279 |
| 7,296,813 B2 | * | 11/2007 | Montague | B62K 21/22 280/276 |
| 7,645,087 B1 | * | 1/2010 | Lin | B62K 21/18 403/109.5 |
| 2002/0139217 A1 | * | 10/2002 | Montague | B62K 15/006 74/493 |
| 2009/0028637 A1 | * | 1/2009 | Coaplen | B62K 21/06 403/365 |
| 2012/0090424 A1 | | 4/2012 | Curran et al. | |
| 2013/0319169 A1 | * | 12/2013 | Savard | B62H 5/06 74/551.8 |

\* cited by examiner

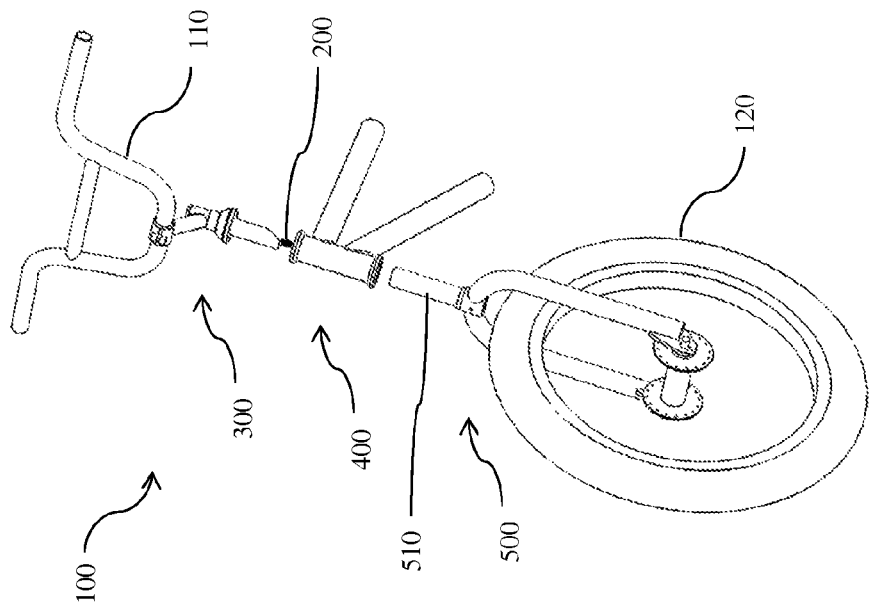
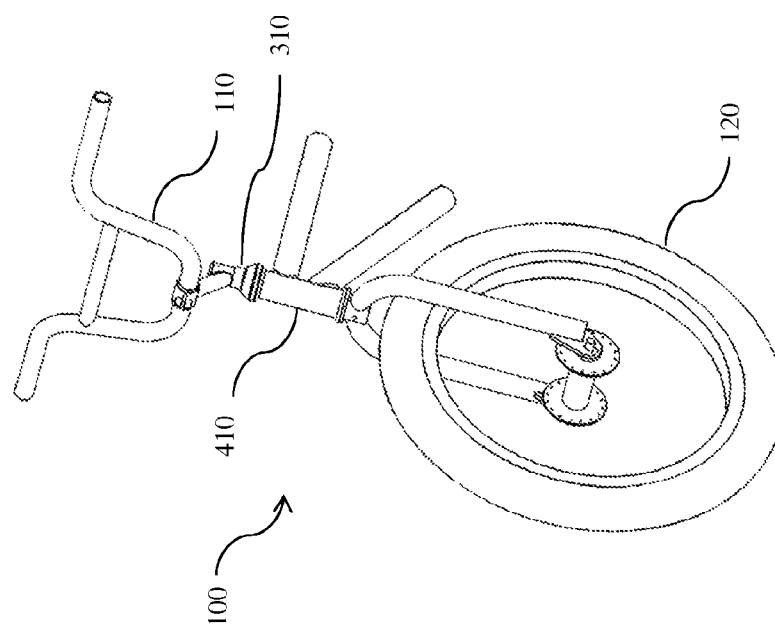
FIGURE 1A
FIGURE 1B

QUICK-ASSEMBLY FRONT END FOR BICYCLES

FIELD OF THE INVENTION

This document concerns an invention relating generally to a system for simplifying bicycle assembly, and specifically to a front end of a bicycle that can be assembled in fewer steps with enhanced alignment and tensioning.

BACKGROUND OF THE INVENTION

Retailers often receive disassembled bicycles requiring assembly by an employee before being sold. Assembling bicycles involves many complicated steps unknown to the unskilled employee or the layperson. Detailed adjustments and fine-tuning are necessary for proper functioning of the bicycle, such as alignment of parts, orientation of the front wheel, fork, and stem, and proper bolt torque. As a result, unskilled assemblers may employ excessive and undesirable "guesswork." Often, bicycles assembled by unskilled employees have their front wheels and/or their forks installed backwards. If proper torque is not achieved, the handlebar and fork may rotate freely and/or disconnect unintentionally. Assuming it is usable in the first place, an improperly-assembled bicycle may be uncomfortable to ride, may suffer decreased performance, and may experience undue wear or premature component failure. The assembly processes thus require tedious attention, and even a few seconds of extra time required during assembly of each bicycle add up to substantially increase costs and reduce the number of bicycles a retailer is otherwise able to assemble and sell. Difficulty in the process of assembling also means employees require more training to be able to assist in assembling bicycles. Further, typical bicycles are shipped by the manufacturer with the front wheel removed, front brake at least partly disassembled, and the handlebar removed. This adds steps required to put together the bicycle, and more potential sources of error in assembly.

What is needed is a system that reduces and simplifies the steps involved in assembling bicycles to shorten assembly times. A system that provides automatic tensioning of bearings and automatic alignment and orientation of the stem relative to the front wheel and fork can reduce error rates, extend the life of bicycles, enhance performance, and potentially reduce the risk of certain failures.

SUMMARY OF THE INVENTION

The invention, which is defined by the claims set forth at the end of this document, is directed to a front end assembly which at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 1A and 2, an exemplary front end assembly 100 for more easily assembling a bicycle includes an elongated center bolt 200, a stem assembly 300 having a stem body 310 and a stem tube 320 extending therefrom, a frame 400 having a head tube 410, and a fork assembly 500 having a steering tube 510 with a wedge 600 immovably fixed therein (by being, for example, pre-welded or riveted 605 to the steering tube 510). The wedge 600 includes a stem interface 610 (such as a gap) that complementarily fits with the stem tube 320, and a bolt interface 620 that securely engages the center bolt 200. To assemble the front end assembly 100, the steering tube 510 is inserted into the head tube 410 of the frame 400 from the bottom, and the stem tube 320 is inserted into the head tube 410 from the top. The center bolt 200 engages the bolt interface 620 of the wedge 600 to secure the stem assembly 300, the frame 400, and the fork assembly 500 together. The stem tube 320 is urged against the stem interface 610 to rotationally align the stem assembly 300 with the fork assembly 500, locking a handlebar 110 in its proper orientation. The position of the wedge 600 within the stem tube 320 helps vertically align the stem assembly 300 with the fork assembly 500. Once the center bolt 200 has securely engaged with the stem interface 610, no other steps are needed in assembling the front end assembly 100.

The exemplary front end assembly 100 allows the assembler to eliminate and simplify steps in putting together bicycles. For example, immovably fixing the wedge 600 within the stem tube 320 eliminates the need for the assembler to guess or calculate the correct position for the stem and fork alignment. The assembler thus need only insert the stem tube 320, find the lowest position of least resistance, and tighten the center bolt 200 to complete assembly. Moreover, the process of assembling most bicycles can be accomplished with one bolt, while maintaining proper alignment, bearing tension, and direction of a front wheel 120, fork assembly 500, and stem assembly 300. Further, preassembly of the front wheel 120 and front brake (not pictured) by the manufacturer in a controlled factory environment, before the bicycle is shipped to a retailer, eliminates the need for skilled workers to connect the various parts and make the needed adjustments. This front end assembly 100 thus reduces or eliminates sources of assembler error, poor alignment, incorrect fastening torque, etc. Additional advantages and features of the invention will be apparent from the remainder of this document in conjunction with the associated drawings.

BRIEF DESCRIPTION OF THE DRAWINGS

FIG. 1A is a perspective view of an exemplary front end assembly 100 in assembled form. FIG. 1B is an exploded view of the front end assembly 100 of FIG. 1A.

DETAILED DESCRIPTION OF PREFERRED VERSIONS OF THE INVENTION

Figure 2:
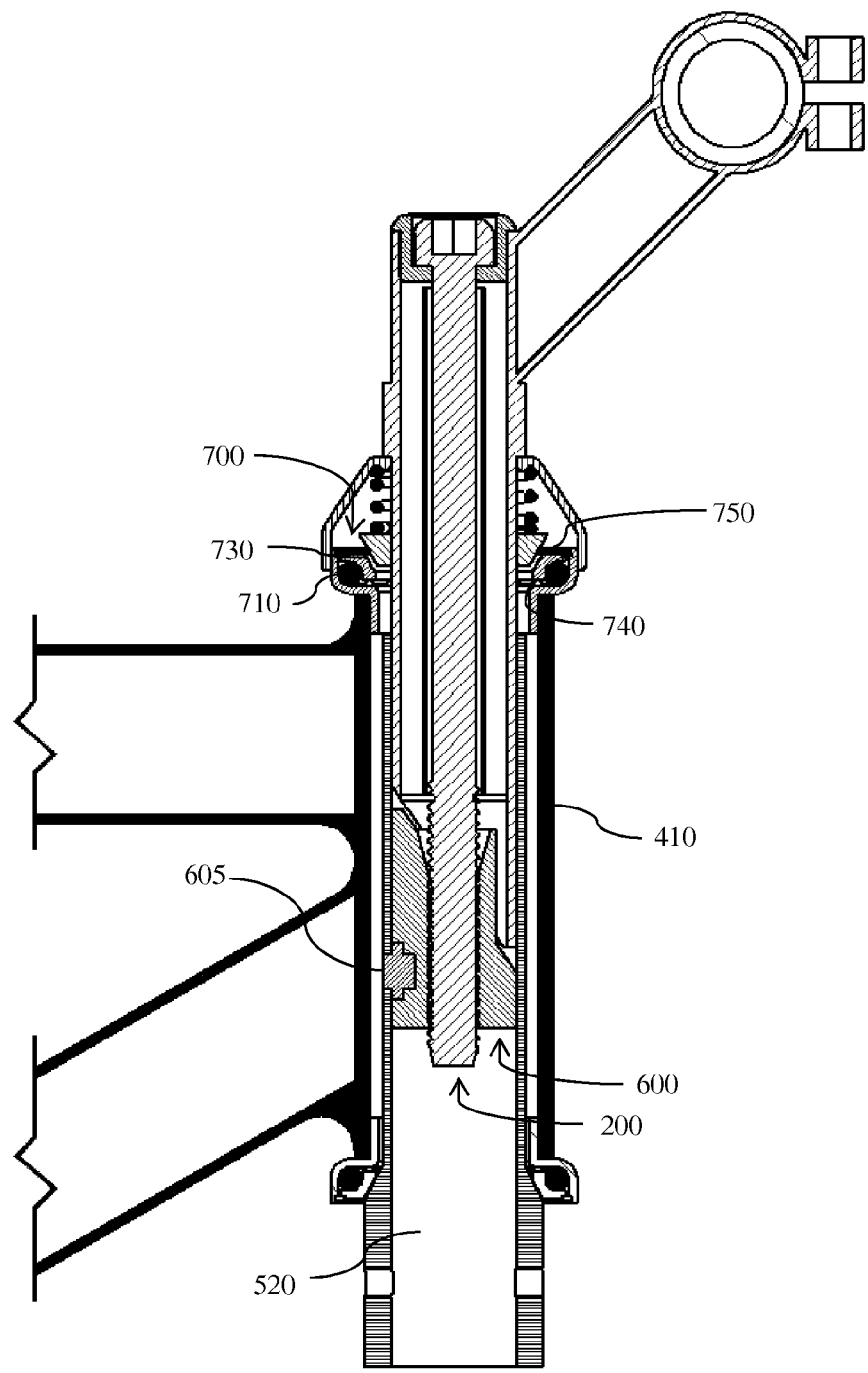
FIG. 2 is a cross-sectional view of the assembled front end assembly 100 of FIGS. 1A and 1B.
Figure 3:
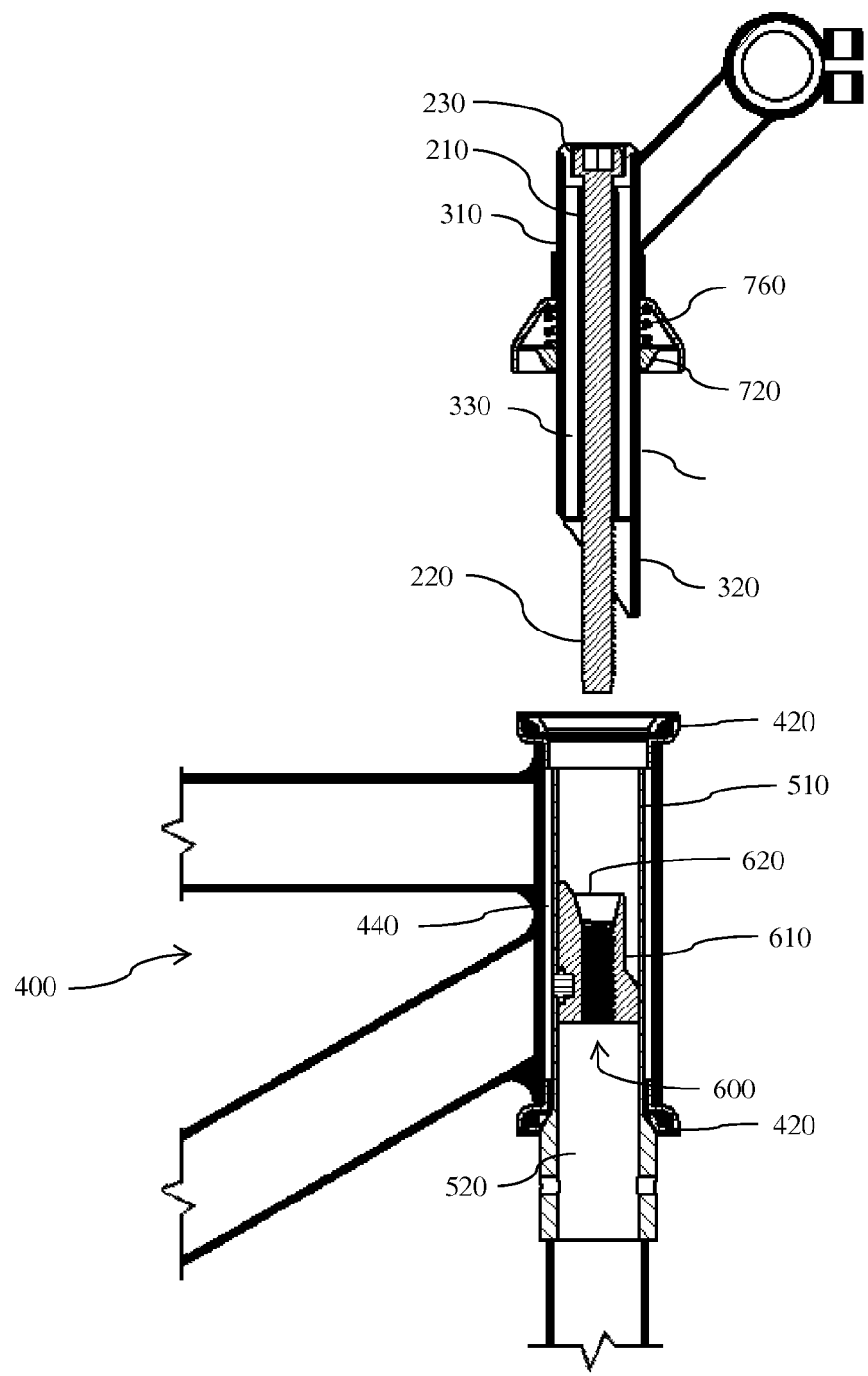
FIG. 3 is a cross-sectional view of the exploded front end assembly 100 of FIGS. 1A and 1B.

With reference also to FIGS. 1B and 3, the elongated center bolt 200 extends from a bolt head 210 to a bolt tail 220. The bolt tail 220 may be externally threaded for threadably engaging an internally threaded bolt interface 620. The bolt head 210 preferably includes a tool interface 230 that allows an assembler to use a rotary-type tool for rotation of the center bolt 200 while tightening the center bolt 200 in the wedge 600. A stem channel 330 extending through the stem body 310 and the stem tube 320 is sized to receive the center bolt 200 therein. The head tube 410 of the frame 400 extends from a head tube top 420 to a head tube bottom 430 and includes a head tube channel 440 sized to receive the stem tube 320 therein. The steering tube 510 of the fork assembly 500 includes an access hole 520 formed therein, and the wedge 600 is fixed in the access hole 520.

The front end assembly 100 preferably includes a headset assembly 700 having a headset bearing 710 situated in the head tube 410 of the frame 400, a headset cup 720 (which may be integrated into the head tube top 420 and/or head tube bottom 430 or may be separate), a headset bearing race 730, a headset race keeper 740; and a headset clip 750. The headset assembly 700 may thus be pressed into the head tube 410 at the head tube top 420 and bottom and may be pre-tensioned and devoid of excess play with the help of a tension spring 760. During assembly, the steering tube 510 may slide through the head tube 410 of the frame 400 until the steering tube 510 rests on the headset bearing 710. The stem tube 320 may then be inserted into the steering tube 510 from above, and the center bolt 200 tightened in the bolt interface 620 of the wedge 600 by rotating the center bolt 200 to allow the center bolt 200 to engage the bolt interface 620 of the wedge 600. The stem interface 610 guides the stem tube 320 into alignment as the center bolt 200 is tightened into the wedge 600 to align the stem assembly 300. Other than securely engaging the center bolt 200 with the bolt interface 620 and complementarily interfitting the stem tube 320 with the stem interface 610, no other step is needed to both secure the stem assembly 300, the frame 400, and the fork assembly 500 together, and to rotationally align the stem assembly 300 with the fork assembly 500. The position of the wedge 600 within the steering tube 510 is set such that the height of the stem assembly 300 relative to the fork assembly 500 is suitable for the bicycle being assembled.

To further reduce the number of steps required by the assembler, the manufacturer may ship a preassembled fork assembly 500 with a front wheel 120 and brakes, and/or a preassembled stem assembly 300 with a handlebar 110. With the front wheel 120 and brakes already installed on the fork assembly 500 (but removed from the bicycle) when shipped by the manufacturer, the unskilled worker is not required to assemble, adjust, and fine-tune these components. For example, the manufacturer may adjust the front brake assembly (if equipped), further shortening the time required for the assembly process, and allowing adjustment of the front brake to be made in a controlled environment by specialists.

It should be understood that various terms referring to orientation and position are used throughout this document—for example, "top" (as in "the stem tube 320 is inserted into the head tube 410 from the top") and "bottom" (as in "a head tube bottom 430")—are relative terms rather than absolute ones. In other words, it should be understood (for example) that the stem tube 320 may be inserted into the head tube 410 from the bottom depending on the overall orientation of the apparatus. Thus, such terms should be regarded as words of convenience, rather than limiting terms. Similarly, it is to be understood that such terms as "forward," "rearward," "left," "right," "upwardly," "downwardly," and the like are also words of convenience and are not to be construed as limiting terms.

Preferred versions of the invention have been reviewed in the foregoing discussion to illustrate different possible features of the invention and the varying ways in which these features may be combined. It must be kept in mind that the front end assembly 100 shown in the accompanying drawings and discussed above are merely exemplary, and may assume a wide variety of configurations different from those noted, and may use components different from those noted. Apart from combining the different features of the foregoing versions in varying ways, other modifications are also considered to be within the scope of the invention. Following is an exemplary list of such modifications.

First, although the above discussion involves exemplary applications of the invention to bicycles, this invention can be modified for use with other wheeled items or any product that needs alignment, assembly, and bearing preload.

Second, although the wedge 600 is discussed in the context of an overall system, the wedge 600 in the stem tube 320 may be used separately as an improvement over current systems offering the features of automatic alignment and a more secure attachment of stem to fork. In the above system, for example, the features discussed combine to lessen assembly time, and help ensure proper alignment and adjustment of a bicycle.

Third, the design can be inverted and manufactured using several alternative iterations. For example: the wedge 600 can be formed or shaped in various ways to accomplish the same function; the stem tube 320 can be formed to match whatever shape the wedge 600 dictates; headset assembly 700 parts can be formed using sealed bearings, no bearings, bushings, or sliders accomplishing the same thing; and the center bolt 200 can be changed to a nut or other fastening device.

Fourth, the front end assembly 100 may alternatively have a "thread less" stem configuration that incorporates the system features in a "clamp on" stem. The same steps may be involved, but components would be specifically made to fit with a "clamp on" design.

The invention is not intended to be limited to the preferred versions of the invention described above, but rather encompasses all different versions that fall literally or equivalently within the scope of the below claims.

What is claimed is:

1. A front end assembly for assembling a bicycle,
   a. the front end assembly including:
      i. an elongated center bolt extending from a bolt head to a bolt tail;
      ii. a stem assembly having:
         1) a stem body and a stem tube extending therefrom;
         2) a stem channel extending through the stem body and the stem tube, the stem channel being sized to receive the center bolt therein;
      iii. a frame having a head tube with a head tube channel sized to receive the stem tube therein, the head tube extending from a head tube top to a head tube bottom; and
      iv. a fork assembly having:
         1) a steering tube with an access hole therein; and
         2) a wedge immovably fixed in the access hole, wherein the wedge:
            a) includes a stem interface that complementarily fits with the stem tube; and
            b) includes a bolt interface configured to engage the bolt tail to secure the center bolt with the wedge; and
   b. wherein the front end assembly is configured to be assembled by:
      i. inserting the steering tube into the head tube of the frame via the head tube bottom;
      ii. inserting the stem tube into the head tube via the head tube top;
      iii. engaging the stem tube with the stem interface of the wedge such that the stem tube and the stem interface complementarily interfit; and
      iv. engaging the center bolt with the bolt interface of the wedge to secure the stem assembly, the frame, and the fork assembly together.

2. The front end assembly of claim 1 configured such that, other than securely engaging the center bolt with the bolt interface and complementarily interfitting the stem tube with the stem interface, no other step is needed to:
  a. secure the stem assembly, the frame, and the fork assembly together,
  b. with the stem assembly rotationally aligned with the fork assembly.

3. The front end assembly of claim 1 wherein the wedge is welded to the steering tube to immovably fix the wedge within the steering tube.

4. The front end assembly of claim 1 wherein complementary interfitting of the stem tube with the stem interface rotationally aligns the stem assembly with the fork assembly.

5. The front end assembly of claim 1 wherein the stem interface of the wedge includes a gap between the steering tube and the wedge, the gap being configured to complementarily engage the stem tube.

6. The front end assembly of claim 1 wherein the front end assembly:
  a. further includes a headset bearing situated in the head tube of the frame;
  b. is configured such that the steering tube slides into the head tube until the steering tube abuts the headset bearing while the front end assembly is being assembled.

7. The front end assembly of claim 1 wherein the bolt head includes a tool interface configured to interfit with a rotary-type tool for rotation of the center bolt, wherein rotation of the center bolt engages the bolt tail with the bolt interface of the wedge.

8. The front end assembly of claim 1 wherein:
  a. the bolt tail is externally threaded;
  b. the bolt interface is internally threaded; and
  c. the bolt tail is threadably engaged with the bolt interface to secure the stem assembly, the frame, and the fork assembly to each other.

9. The front end assembly of claim 1 wherein the stem interface of the wedge is configured to rotationally align the stem assembly with the fork assembly by guiding the stem tube into alignment as the bolt tail engages the bolt interface.

10. The front end assembly of claim 1 wherein the wedge is positioned within the access hole such that when the stem assembly is secured to the fork assembly, the stem assembly is vertically aligned with the fork assembly.

11. The front end assembly of claim 1 wherein:
  a. the front end assembly further includes a headset assembly having a headset bearing;
  b. when the front end assembly is assembled, the headset assembly is positioned within the head tube and about the stem tube.

12. The front end assembly of claim 11 wherein the headset assembly further includes:
  a. a headset cup;
  b. a headset bearing race; and
  c. a headset race keeper.

13. A method of using a front end assembly in assembling a bicycle,
  a. the front end assembly including:
    i. an elongated center bolt extending from a bolt head to a bolt tail;
    ii. a stem assembly having:
      1) a stem body and a stem tube extending therefrom;
      2) a stem channel extending through the stem body and the stem tube, the stem channel being sized to receive the center bolt therein;
    iii. a frame having a head tube with a head tube channel sized to receive the stem tube therein, the head tube extending from a head tube top to a head tube bottom; and
    iv. a fork assembly having:
      1) a steering tube with an access hole therein; and
      2) a wedge immovably secured to the steering tube in the access hole, wherein the wedge:
        a) includes a stem interface that complementarily fits with the stem tube; and
        b) includes a bolt interface configured to engage the bolt tail to secure the center bolt with the wedge; and
  b. wherein the method includes the step of assembling the front end assembly by:
    i. inserting the steering tube into the head tube of the frame via the head tube bottom;
    ii. inserting the stem tube into the head tube via the head tube top;
    iii. engaging the stem tube with the stem interface of the wedge such that the stem tube and the stem interface complementarily interfit; and
    iv. engaging the center bolt with the bolt interface of the wedge to secure the stem assembly, the frame, and the fork assembly together.

14. The method of claim 13 wherein once the center bolt is securely engaged with the bolt interface, no additional steps are needed to secure the stem assembly, the frame, and the fork assembly together.

15. The method of claim 13 wherein:
  a. the bolt head includes a tool interface configured to interfit with a rotary-type tool for rotation of the center bolt;
  b. the bolt tail is externally threaded, and the bolt interface is internally threaded; and
  c. the method further includes the step of using a rotary-type tool to threadably engage the center bolt with the bolt interface of the wedge.

16. The method of claim 13 further including the step of rotationally aligning the stem assembly with the fork by interfitting the stem tube with the stem interface of the wedge.

17. A method of using a front end assembly in assembling a bicycle,
  a. the front end assembly including:
    i. an elongated center bolt;
    ii. a stem assembly having:
      1) a stem body and a stem tube extending therefrom; and
      2) a stem channel extending through the stem body and the stem tube, the stem channel being sized to receive the center bolt therein;
    iii. a frame having a head tube with a head tube channel sized to receive the stem tube therein;
    iv. a fork assembly having:
      1) a steering tube with an access hole therein;
      2) a wedge immovably attached to the steering tube within the access hole, wherein the wedge includes a bolt interface configured to threadably engage the center bolt; and
    v. a headset assembly having a headset bearing situated in the head tube of the frame;
  b. wherein the method includes the step of assembling the front end assembly by:
    i. sliding the steering tube through the head tube of the frame until the steering tube rests on the headset bearing;

ii. inserting the stem tube into the steering tube from above; and
iii. tightening the center bolt in the bolt interface of the wedge by rotating the center bolt as the center bolt engages the bolt interface of the wedge.

18. The method of claim 17 wherein:
a. the wedge further includes a stem interface that complementarily fits with the stem tube in an aligned orientation; and
b. the method further includes the step of rotationally aligning the stem assembly with the fork by interfitting the stem interface and the stem tube.

19. The method of claim 17 wherein:
a. the center bolt extends from a bolt head to a bolt tail,
   i. the bolt head having a tool interface configured to interfit with a rotary-type tool for rotation of the center bolt, and
   ii. the bolt tail being externally threaded;
b. the center bolt is tightened by using a rotary-type tool to rotate the center bolt.

20. The method of claim 17 wherein:
a. the fork assembly is preassembled with a front wheel; and
b. the stem assembly is preassembled with a handlebar.

* * * * *